Jan. 27, 1948. A. W. GARDINER ET AL 2,435,037
AIRPLANE ENGINE AND PROPELLER PITCH CONTROL
Filed Nov. 6, 1943 3 Sheets-Sheet 1

Inventors
Arthur W. Gardiner &
Willard T. Nickel
By Blackmore, Spencer & Flint
Attorneys

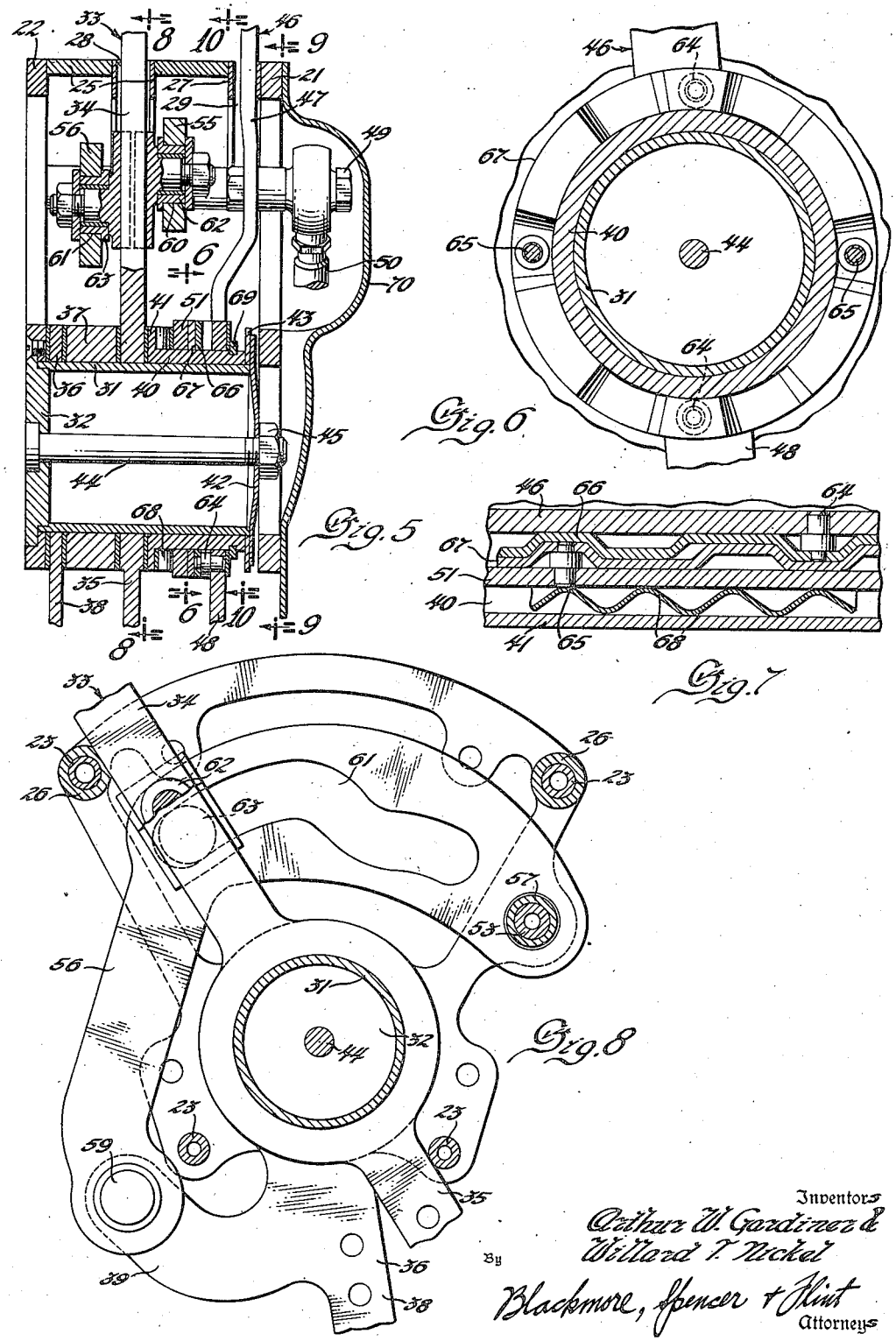

Jan. 27, 1948. A. W. GARDINER ET AL 2,435,037
AIRPLANE ENGINE AND PROPELLER PITCH CONTROL
Filed Nov. 6, 1943 3 Sheets-Sheet 3
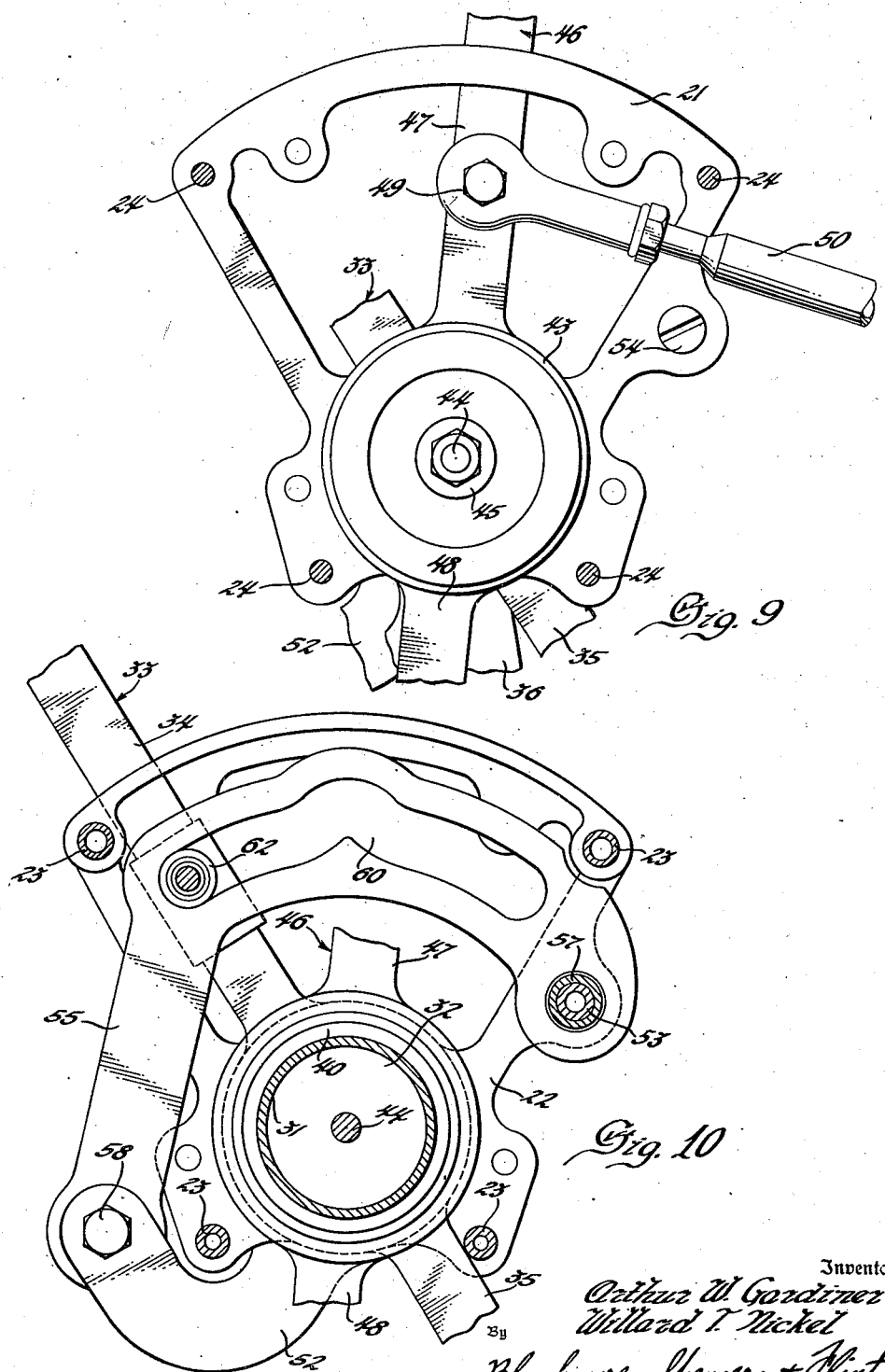

Patented Jan. 27, 1948

2,435,037

UNITED STATES PATENT OFFICE 2,435,037

AIRPLANE ENGINE AND PROPELLER PITCH CONTROL

Arthur W. Gardiner and Willard T. Nickel, Indianapolis, Ind., assignors to General Motors Corporation, Detroit, Mich., a corporation of Delaware Application November 6, 1943, Serial No. 509,190

7 Claims. (Cl. 74—471)

This invention has to do with controls for a plurality of elements.

The object of the invention is to provide a control through which by movement of a single member a plurality of elements may be actuated differentially and by movement of another member or members one or more of the elements may be actuated independently of the other element or elements.

The invention was prompted by the need of a control which would relieve an airplane pilot of the necessity of separately adjusting the propeller pitch and mixture ratio regulators each time he moved the throttle valve or other mixture supply regulator and still leave it possible for him to adjust the mixture ratio regulator independently of the throttle valve or other mixture supply regulator and the propeller pitch regulator. And while this now appears to be the principal field of utility of the invention it will, of course, be understood that our control may be employed in other fields in which controls with any or all of its characteristics may be found useful.

For a better understanding of the nature and objects of this invention reference is made to the following specification and the accompanying drawing wherein the preferred embodiment of the invention is described and illustrated.

In the accompanying drawing:

Figure 5 is an enlarged section through the control at a right angle to the planes in which the main and mixture ratio levers move.

Figure 6 is an enlarged section on the line 6—6 of Figure 5.

Figure 7 is a development of an enlarged section through a portion of the clutch included in the control on an arc coaxial with the clutch.

Figure 8 is a view taken as indicated by the line 8—8 of Figure 5.

Figure 9 is a view taken as indicated by the line 9—9 of Figure 5.

Figure 10 is a view taken as indicated by the line 10—10 of Figure 5.

Figure 3:
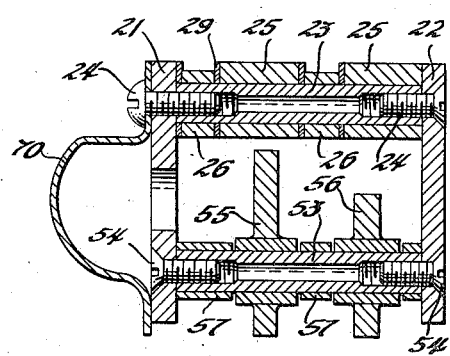
Figure 3 is an enlarged section on the line 3—3 of Figure 1.
Figure 1:
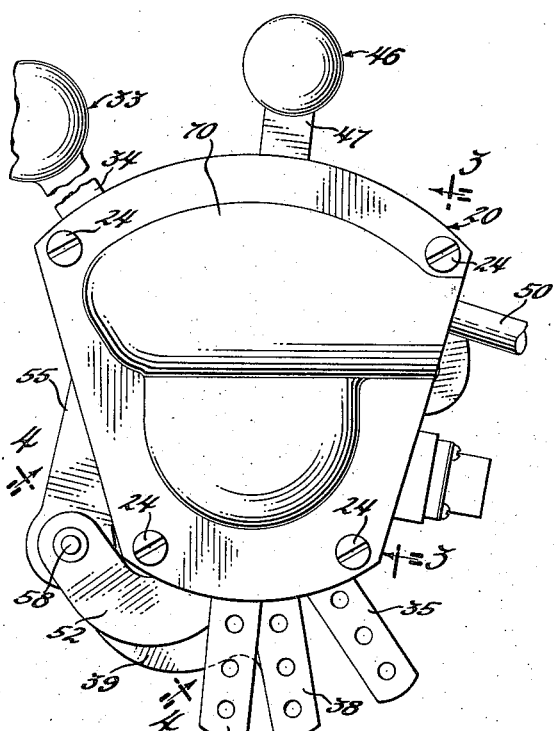
Figure 1 is a side elevation of an airplane mixture supply, mixture ratio and propeller pitch control in accordance with our invention.
Figure 4:
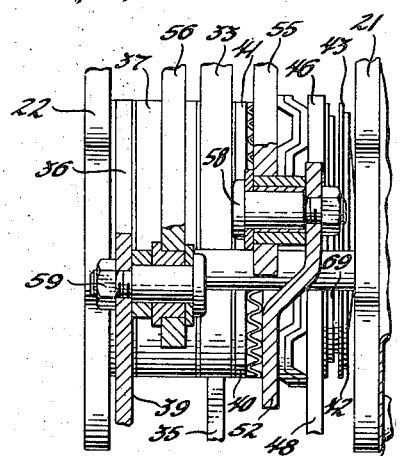
Figure 4 is an enlarged view taken as indicated by the line 4—4 of Figure 1.
Figure 2:
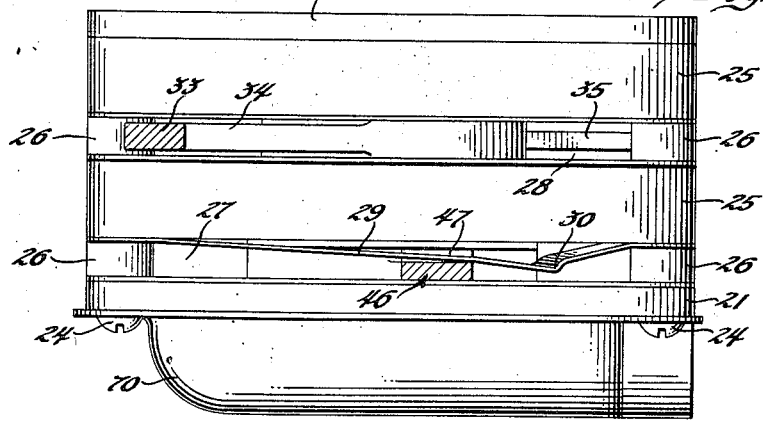
Figure 2 is an enlarged top plan view of the control with the extremities of the main and mixture ratio levers removed.

The control illustrated in the drawing includes a frame 20 which consists of front and rear generally segment-shaped members 21 and 22 spaced apart by tubular struts 23 and secured together by screws 24 which extend through the segment-shaped members and are threaded into the ends of the struts. On the upper struts 23 are mounted members 25 curved to conform to the contour of the upper edges of the segment-shaped members and separated from each other and the front segment-shaped member 21 by spacers 26 to define guide slots 27 and 28 along one side of the former of which extends a spring 29 in which there is formed a detent 30. From the lower portion of the rear segment-shaped member 22 to a point near but spaced from the front segment-shaped member 21 there extends a hollow stub shaft 31 which is carried by a plate 32 which is secured to the rear segment-shaped member.

Mounted so that it can rock on the shaft 31 is a main lever 33 which includes a hub portion which encircles the shaft, an operating arm 34 which extends through the slot 28 between the members 25 and an arm 35 for connection to the mixture supply regulator. Between the main lever 33 and the rear segment-shaped member 22 there is mounted so that it can rock on the shaft 31 a crank 36 which includes a hub which encircles the shaft and is spaced from the main lever by a spacer 37, an arm 38 for connection to the propeller pitch regulator and an operating arm 39. On the other side of the main lever 33 there is mounted on the shaft 31 a cylindrical carrier 40 with a flange 41 on its end nearest the main lever. The main lever, the crank 36, the spacer 37 and the carrier 40 are held in place on the shaft 31 by a dished spring washer 42 whose margin is seated against the end of the carrier through the intermediary of washer 43, a bolt 44 which extends through the plate 32 and the spring washer 42 and a nut 45.

On the carrier 40 near its outer end there is mounted so that it can rock a mixture ratio lever 46 which includes a hub which encircles the carrier, an operating arm 47 which extends through the slot 27 between the front segment-shaped member 21 and the nearest of the members 25 and an arm 48. To the operating arm 47 of the mixture ratio lever 46 there is connected by a bolt 49, a rod 50 for connection to the mixture ratio regulator, but in cases in which it is more advantageous the mixture ratio regulator may be connected to the arm 48 instead of to the operating arm 47 of the mixture ratio lever. On the carrier 40 between the mixture ratio lever 46 and the flange 41 there is mounted so that it can rock a ring 51 with an operating arm 52 which encircles the carrier.

Between the front and rear segment-shaped members 21 and 22 below the upper right-hand strut 23 extends a tubular shaft 53 which is secured in place by screws 54 which extend through the segment-shaped members and are threaded into the shaft. Mounted so that they can rock at one end on the shaft 53 are angle-shaped arms 55 and 56 which extend transversely of the frame 20 and then downwardly and are so located by spacers 57 that the former is disposed in front of and the latter to the rear of the plane in which the main lever 33 rocks. The lower end of the arm 55 is hinged by a bolt 58 to the operating arm 52 on the ring 51 and the lower end of the arm 56 by a bolt 59 to the operating arm 39 on the crank 36. In the transversely extending portion of the arm 55 there is formed a cam slot 60 and in the transversely extending portion of the arm 56 a cam slot 61. On the main lever 33 there are mounted rollers 62 and 63 which are disposed, respectively, in the cam slot 60 in the arm 55 and in the cam slot 61 in the arm 56 so that when the main lever is rocked the arms and, through them, the ring 51 and the crank 36 are rocked.

To the opposed faces of the hub of the mixture ratio lever 46 and the ring 51 there are anchored by pins 64 and 65 clutch rings 66 and 67 of zigzag contour whose zigs are parallel and whose zags are inclined at about 45° to the planes of the rings. The zigs are of such length and so spaced circumferentially of the clutch rings that the projections on them interfit in only one of the angular positions with respect to each other into which the rings can be moved. In all other angular positions with respect to each other into which the rings can be moved the projecting zigs ride on each other.

To hold the clutch rings 66 and 67 in the angular position with respect to each other in which the projections on them interfit so that the mixture ratio lever 46 will be rocked when the main lever 33 is rocked there is provided between the ring 51 and the flange 41 on the carrier 40 a spring ring 68 of wavy contour. To hold the mixture ratio lever, the clutch rings, the ring 51 and the spring 68 in place on the carrier with the spring 68 compressed there is provided a snap ring 69.

Over the front segment-shaped member 21 there is secured a cover 70 with a bulge in it to accommodate the rod 50 and the bolt which hinges it to the mixture ratio lever 46.

When the main lever 33 is rocked to adjust the mixture supply regulator to increase or decrease the supply of mixture to the engine, the crank 36 and the ring 51 are, as we have indicated, through the cams 63 and 62 and the arms 56 and 55, rocked on the shaft 31. If the clutch rings 66 and 67 are in the angular positions with respect to each other in which the projections on them interfit, the mixture ratio lever 46 will, as we have also indicated, rock with the ring 51. The relation to the adjustment of the mixture supply regulator of the adjustments of the propeller pitch and mixture ratio regulators thus effected is, of course, dependent upon the shapes of the cam slots 60 and 61 and, consequently, if the slots are made of the proper shapes the rocking of the main lever will, without any further action by the pilot, result in adjustments of the propeller pitch and mixture ratio regulators which are, for normal operation of the airplane, properly correlated to the adjustment of the mixture supply regulator. The cam slot 60 in the arm 55 is, however, so shaped that the arc through which the mixture ratio lever is rocked by rocking the main lever terminates well short of the ends of the slot 27.

The mixture ratio lever 46 can, however, by application of force to its operating arm 47 be rocked beyond the arc through which it is rocked by the main lever to cut off entirely the supply of mixture to stop the engine or to increase the mixture ratio to obtain in an emergency more power than is available with the normal mixture ratio.

When the main lever is in the position in which it is shown in the drawing, application to the operating arm of the mixture ratio lever of force in the direction to rock it to the left will, since the main lever can rock no farther in that direction, cause the projections on the clutch ring 66 to ride up the inclined zags out of the depressions in the clutch ring 67 and then further rocking of the clutch ring 66 to the left with the projecting zigs on it riding on the projecting zigs on the clutch ring 67 until the operating arm of the mixture ratio lever reaches the left-hand extremity of the slot 27. When the operating arm of the mixture ratio lever reaches the left-hand extremity of the slot 27, the supply of mixture to the engine will have been entirely cut off.

When the operating arm of the main lever is at the right-hand extremity of the slot 28, application to the operating arm of the mixture ratio lever of force in the direction to rock it to the right will, since the main lever can rock no farther in that direction, cause the projections on the clutch ring 66 to ride up the inclined zags out of the depressions in the clutch ring 67 and then further rocking of the clutch ring 66 to the right with the projecting zigs on it riding on the projecting zigs on the clutch ring 67 until the operating arm of the mixture ratio lever reaches the right-hand extremity of the slot 27. When its operating arm reaches the right-hand extremity of the slot 27, the mixture ratio lever will have effected such an adjustment of the mixture ratio regulator that the mixture ratio is increased beyond the normal mixture ratio. When the operating arm of the mixture ratio lever reaches the right-hand extremity of the slot 27 it catches behind the detent 30 in the spring 29. After the mixture ratio lever has been rocked to this position, application of force to the operating arm of the main lever in a direction to rock it in the slot 28 will cause rocking of the clutch ring 67 with respect to the clutch ring 66 with the projecting zigs on it riding on the projecting zigs on the clutch ring 66 and adjustments of the mixture supply and propeller pitch regulators but no rocking of the mixture ratio lever or adjustments of the mixture ratio regulator until the operating arm of the mixture ratio lever is rocked from behind the detent 30 by the application of force to it.

After the mixture ratio lever has been rocked to the position in which the supply of mixture to the engine is entirely cut off or to the position in which the mixture ratio is increased beyond the normal mixture ratio, it can, of course, be returned to the position in which the adjustment of the mixture ratio regulator is controlled by the main lever by rocking it to a position with respect to the main lever in which the clutch rings 66 and 67 are in the angular positions with respect

We claim:

1. In a control, a shaft, an annular member mounted so that it may rock on the shaft, an arm with a cam surface on it mounted so that it may rock connected to the annular member, an operated arm mounted so that it may rock on the shaft, an operating lever connected to the operated arm so that it may rock it on the shaft, means on the operating lever which contacts the cam surface on the first specified arm so that operation of the operating lever may rock the annular member on the shaft, an operated arm mounted so that it may rock on the shaft, an operating lever connected to the second specified operated arm so that it may rock it on the shaft, means for holding the second specified operated arm in a position, and a clutch through which the second specified operated arm is connected to the annular member so that it may be rocked by operation of the first specified operating lever but operation of the second specified operating lever may rock it independently of the first specified operated arm and the first specified operated arm may be rocked by the first specified operating lever independently of the second specified operated arm when the second specified operated arm is held in the mentioned position, including annular members with interfitting projections and depressions joined by inclines which encircle the shaft and are connected, respectively, to the first specified annular member and the second specified operated arm, and a spring which encircles the shaft and urges the last specified annular members toward each other.

2. In a control, an operating lever, a shaft, an operated arm mounted so that it may rock on the shaft, an operating lever connected to the operated arm so that it may rock it on the shaft, and means including a clutch through which the operated arm is connected to the first specified operating lever so that it may be rocked by it but operation of the second specified operating lever may rock the operated arm independently of the first specified operating lever, including annular members with interfitting projections and depressions joined by inclines which encircle the shaft and are connected, respectively, to the operated arm and the first specified operating lever, and a spring which urges the last specified annular members toward each other.

3. In a control, an operating member, an operated member connected to the operating member so that it may be moved thereby, an operating member, an operated member connected to the second specified operating member so that it may be moved thereby, means for holding the second specified operated member in a position, and means including a clutch through which the second specified operated member is connected to the first specified operating member so that it may be moved thereby but is releasable by operation of the second specified operating member so that operation of the second specified operating member may move the second specified operated member to the mentioned position independently of the first specified operated member and operation of the first specified operating member may move the first specified operated member independently of the second specified operated member when it is in the mentioned position.

4. In a control, an operating member, an operated member connected to the operating member so that it may be moved thereby, a second operating member, an operated member connected to the second specified operating member so that it may be moved thereby, and means including a clutch through which the second specified operated member is connected to the first specified operating member so that it may be moved thereby but is releasable by operation of the second specified operating member so that operation of the second specified operating member may move the second specified operated member independently of the first specified operated member.

5. In a control, a shaft, an operating member which is mounted so that it may rock on the shaft and includes a portion which encircles the shaft, an operated member mounted so that it may rock on the shaft and connected to the operating member so that it may be rocked on the shaft by it, another operating member mounted so that it may rock on the shaft, another operated member which is mounted so that it may rock on the shaft and is connected to the second specified operating member so that it may be rocked on the shaft by it and includes a portion which encircles the shaft, and means including a clutch, having engaging elements mounted on the portions of the first specified operating member and the second specified operated member which encircle the shaft, through which the second specified operated member is connected to the first specified operating member so that the second specified operated member may be moved by the first specified operating member but is releasable by operation of the second specified operating member in the direction to move the second specified operated member so that operation of the second specified operating member may move the second specified operated member independently of the first specified operated member.

6. In a control, a shaft, an operating member which is mounted so that it may rock on the shaft and includes a portion which encircles the shaft, an operated member mounted so that it may rock on the shaft and connected to the operating member so that it may be rocked on the shaft by it, another operating member mounted so that it may rock on the shaft, another operated member which is mounted so that it may rock on the shaft and is connected to the second specified operating member so that it may be rocked on the shaft by it and includes a portion which encircles the shaft, means for holding the second specified operated member in a position, and means including a clutch, having engaging elements mounted on the portions of the first specified operating member and the second specified operated member which encircle the shaft, through which the second specified operated member is connected to the first specified operating member so that the second specified operated member may be moved by the first specified operating member but is releasable by operation of the second specified operating member in the direction to move the second specified operated member so that operation of the second specified operating member may move the second specified operated member to the mentioned position independently of the first specified operated member and operation of the first specified operating member may move the first specified operated member independently of the second specified operated member when it is in the mentioned position.

7. In a control, a shaft, an operating member which is mounted so that it may rock on the shaft and includes a portion which encircles the shaft, an operated member mounted so that it may rock on the shaft and connected to the operating member so that it may be rocked on the shaft by it, another operating member mounted so that it may rock on the shaft, another operated member which is mounted so that it may rock on the shaft and is connected to the second specified operating member so that it may be rocked on the shaft by it and includes a portion which encircles the shaft, means for holding the second specified operated member in a position, and means including a clutch, having annular members with interfitting projections and depressions of different lengths joined by inclines mounted on the portions of the first specified operating member and the second specified operated member which encircle the shaft and a spring which urges the members toward each other but yields so that the projections may ride up the inclines onto each other when sufficient relative force is applied to the members, through which the second specified operated member is connected to the first specified operating member so that the second specified operated member may be moved by the first specified operating member but is releasable by operation of the second specified operating member in the direction to move the second specified operated member so that operation of the second specified operating member may move the second specified operated member to the mentioned position independently of the first specified operated member and operation of the first specified operating member may move the first specified operated member independently of the second specified operated member when it is in the mentioned position.

ARTHUR W. GARDINER.
WILLARD T. NICKEL.

REFERENCES CITED

The following references are of record in the file of this patent:

UNITED STATES PATENTS

| Number | Name | Date |
| --- | --- | --- |
| Re. 15,888 | McCauley | Aug. 5, 1924 |
| 691,698 | Paine | Jan. 28, 1902 |
| 1,471,497 | Martin | Oct. 23, 1923 |
| 1,549,697 | Whittacker | Aug. 11, 1925 |
| 1,910,125 | Levedahl | May 23, 1933 |
| 1,911,507 | Hitchcock | May 30, 1933 |
| 1,978,429 | King | Oct. 30, 1934 |
| 1,998,362 | Dodson | Apr. 16, 1935 |
| 2,154,887 | Baker | Apr. 18, 1939 |
| 2,292,091 | Rhodes | Aug. 4, 1942 |

FOREIGN PATENTS

| Number | Country | Date |
| --- | --- | --- |
| 749,550 | France | 1933 |
| 769,074 | France | June 5, 1934 |